United States Patent
Hanrahan (10) Patent No.: US 11,958,624 B2
(45) Date of Patent: Apr. 16, 2024

(54) SELECTIVE POWER DISTRIBUTION FOR AN AIRCRAFT PROPULSION SYSTEM

(71) Applicant: Raytheon Technologies Corporation, Farmington, CT (US)

(72) Inventor: Paul R. Hanrahan, Sedona, AZ (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/202,734

(22) Filed: May 26, 2023

(65) Prior Publication Data
US 2023/0382549 A1 Nov. 30, 2023

Related U.S. Application Data (60) Provisional application No. 63/346,177, filed on May 26, 2022.

(51) Int. Cl.
| | | |
|---|---|---|
| *B64D 35/04* | (2006.01) | |
| *B64D 35/02* | (2006.01) | |
| *F02C 7/36* | (2006.01) | |
| *B64D 27/02* | (2006.01) | |

(52) U.S. Cl.
CPC ............. *B64D 35/04* (2013.01); *B64D 35/02* (2013.01); *F02C 7/36* (2013.01); *B64D 2027/026* (2013.01)

(58) Field of Classification Search
CPC .. B64D 35/02; B64D 35/04; B64D 2027/026; F02C 7/36; F16H 3/72; F16H 2200/2007
See application file for complete search history.

(56) References Cited

U.S. PATENT DOCUMENTS

| | | | |
|---|---|---|---|
| 4,651,521 A | 3/1987 | Ossi | |
| 4,791,783 A | 12/1988 | Neitzel | |
| 4,997,414 A | 3/1991 | Camara | |
| 5,209,428 A | 5/1993 | Bevilaqua | |
| 6,269,627 B1 | 8/2001 | Freese | |
| 6,270,037 B1 | 8/2001 | Freese | |
| 10,669,946 B2 * | 6/2020 | Sheridan | F02C 7/36 |
| 2014/0010652 A1 | 1/2014 | Suntharalingam | |
| 2015/0274287 A1 | 10/2015 | Robertson | |

(Continued)

FOREIGN PATENT DOCUMENTS

WO 2016090390 A1 6/2016

OTHER PUBLICATIONS

EP Search Report for EP Patent Application No. 23175773.3 dated Oct. 23, 2023.

*Primary Examiner* — Edwin A Young
(74) *Attorney, Agent, or Firm* — Getz Balich LLC (57) ABSTRACT

An assembly is provided for an aircraft. This aircraft assembly includes a carrier, a first gear system, a second gear system and an idler. The first gear system includes a first sun gear, a first ring gear and a plurality of first intermediate gears. Each of the first intermediate gears is between and is meshed with the first sun gear and the first ring gear. Each of the first intermediate gears is rotatably mounted to the carrier. The second gear system includes a second sun gear, a second ring gear and a plurality of second intermediate gears. Each of the second intermediate gears is between and is meshed with the second sun gear and the second ring gear. Each of the second intermediate gears is rotatably mounted to the carrier. The idler gear couples the first ring gear to the second ring gear.

20 Claims, 10 Drawing Sheets

(56) References Cited

U.S. PATENT DOCUMENTS

| | | | |
|---|---|---|---|
| 2016/0185460 A1* | 6/2016 | Cedoz | B64D 35/06 |
| | | | 416/128 |
| 2018/0266316 A1* | 9/2018 | Soulat | B64D 27/18 |
| 2020/0017229 A1 | 1/2020 | Steinert | |
| 2021/0229796 A1* | 7/2021 | Mitrovic | B64C 11/46 |
| 2021/0317800 A1 | 10/2021 | Yesilcimen | |

* cited by examiner

SELECTIVE POWER DISTRIBUTION FOR AN AIRCRAFT PROPULSION SYSTEM

This application claims priority to U.S. Patent Appln. No. 63/346,177 filed May 26, 2022, which is hereby incorporated herein by reference in its entirety.

BACKGROUND OF THE DISCLOSURE

1. Technical Field

This disclosure relates generally to an aircraft propulsion system and, more particularly, to power distribution between different rotors of the aircraft propulsion system.

2. Background Information

Various types and configurations of propulsion systems are known in the art for an aircraft. While these known aircraft propulsion systems have various benefits, there is still room in the art for improvement.

SUMMARY OF THE DISCLOSURE

According to an aspect of the present disclosure, an assembly is provided for an aircraft. This aircraft assembly includes a carrier, a first gear system, a second gear system and an idler. The first gear system includes a first sun gear, a first ring gear and a plurality of first intermediate gears. Each of the first intermediate gears is between and is meshed with the first sun gear and the first ring gear. Each of the first intermediate gears is rotatably mounted to the carrier. The second gear system includes a second sun gear, a second ring gear and a plurality of second intermediate gears. Each of the second intermediate gears is between and is meshed with the second sun gear and the second ring gear. Each of the second intermediate gears is rotatably mounted to the carrier. The idler gear couples the first ring gear to the second ring gear.

According to another aspect of the present disclosure, another assembly is provided for an aircraft. This aircraft assembly includes a rotating structure, an epicyclic gear system, a carrier, a first propulsor rotor, a second propulsor rotor and an electric machine. The rotating structure includes a turbine rotor. The epicyclic gear system includes a sun gear, a ring gear and a plurality of intermediate gears. The sun gear is rotatably driven by the rotating structure. Each of the intermediate gears is between and is meshed with the sun gear and the ring gear. The carrier rotatably supports each of the intermediate gears. The first propulsor rotor is coupled to the ring gear. The second propulsor rotor is coupled to the carrier. The electric machine is coupled to the first propulsor rotor and the second propulsor rotor through the epicyclic gear system. The assembly is configured to stop rotation of the first propulsor rotor using the electric machine while the second propulsor rotor continues to rotate. The assembly is also or alternatively configured to stop rotation of the second propulsor rotor using the electric machine while the first propulsor rotor continues to rotate.

According to still another aspect of the present disclosure, another assembly is provided for an aircraft. This aircraft assembly includes a rotating structure, an epicyclic gear system, a carrier, a first propulsor rotor, a second propulsor rotor and a lock system. The rotating structure includes a turbine rotor. The epicyclic gear system includes a sun gear, a ring gear and a plurality of intermediate gears. The sun gear is rotatably driven by the rotating structure. Each of the intermediate gears is between and is meshed with the sun gear and the ring gear. The carrier rotatably supports each of the intermediate gears. The first propulsor rotor is coupled to the ring gear. The second propulsor rotor is coupled to the carrier. The lock system is configured to lock rotation of the ring gear about a centerline axis during a second propulsor mode of operation. The lock system is also or alternatively configured to lock rotation of the carrier about the centerline axis during a first propulsor mode of operation.

The assembly may also include an electric machine coupled to the first propulsor rotor and the second propulsor rotor through the epicyclic gear system. The assembly may be configured to stop rotation of the ring gear using the electric machine to facilitate locking rotation of the ring gear about the centerline axis. The assembly may also or alternatively be configured to stop rotation of the carrier using the electric machine to facilitate locking rotation of the carrier about the centerline axis.

The assembly may include a first lock device configured to lock rotation of the ring gear about a centerline axis when rotation of the first propulsor rotor is stopped. The assembly may also or alternatively include a second lock device configured to lock rotation of the carrier about the centerline axis when rotation of the second propulsor rotor is stopped.

The assembly may also include a second epicyclic gear system and an idler gear. The second epicyclic gear system may include a second sun gear, a second ring gear and a plurality of second intermediate gears. The second sun gear may be rotatably driven by the electric machine. Each of the second intermediate gears may be between and meshed with the second sun gear and the second ring gear. Each of the second intermediate gears may be rotatably mounted to the carrier. The idler gear may be between and meshed with the ring gear and the second ring gear.

The carrier, the first sun gear, the first ring gear, the second sun gear and the second ring gear may each be rotatable about a centerline axis.

The idler gear may be arranged between and may be meshed with the first ring gear and the second ring gear.

The assembly may also include an electric machine configured to drive rotation of the second sun gear about a centerline axis.

The electric machine may be configured to drive the first ring gear down to a zero rotational speed about the centerline axis.

The assembly may also include a lock device configured to lock rotation of the first ring gear about the centerline axis when the first ring gear is at the zero rotational speed.

The lock device may be configured as or otherwise include a splined coupling.

The electric machine may be configured to drive the carrier down to a zero rotational speed about the centerline axis.

The assembly may also include a lock device configured to lock rotation of the carrier about the centerline axis when the first ring gear is at the zero rotational speed.

The assembly may also include a gas turbine engine core. The gas turbine engine core may include a compressor section, a combustor section, a turbine section and a rotating structure. The rotating structure may include a turbine rotor within the turbine section. The rotating structure may be coupled to and configured to drive rotation of the first sun gear.

The assembly may also include a first propulsor rotor and a second propulsor rotor. The first propulsor rotor may be coupled to and configured to be rotatably driven by the first ring gear. The second propulsor rotor may be coupled to and configured to be rotatably driven by the carrier.

The first propulsor rotor may be rotatable about a first axis. The second propulsor rotor may be rotatable about a second axis that is angularly offset from the first axis.

The first propulsor rotor may be configured to generate propulsive force in a first direction. The second propulsor rotor may be configured to generate propulsive force in a second direction that is different than the first direction.

The first propulsor rotor may be configured as or otherwise include a ducted rotor.

The second propulsor rotor may be configured as or otherwise include an open rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
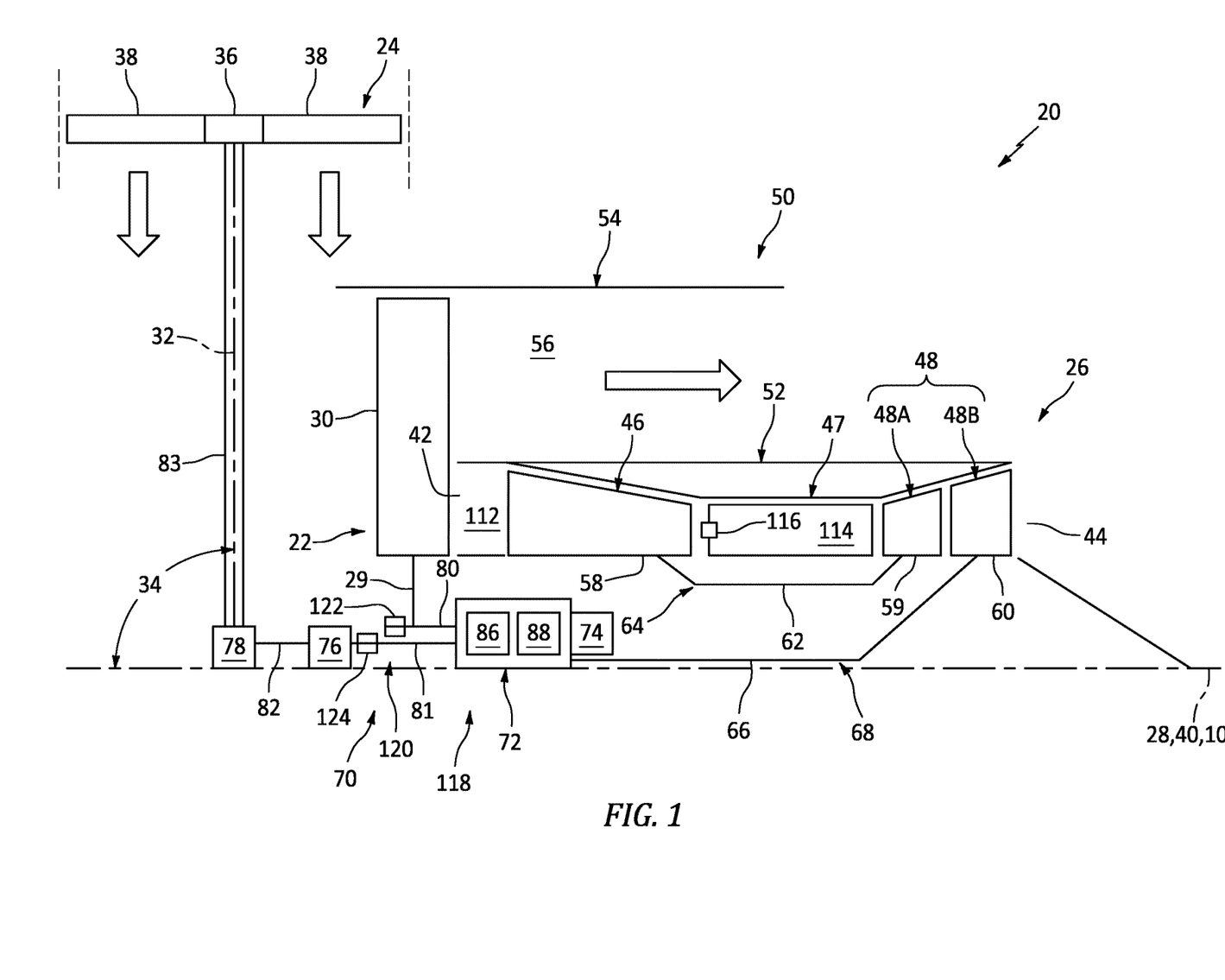
FIG. 1 is a partial, schematic illustration of an aircraft propulsion system.

FIG. 1 schematically illustrates a propulsion system 20 for an aircraft. The aircraft may be an airplane, a helicopter, a drone (e.g., an unmanned aerial vehicle (UAV)), a spacecraft or any other manned or unmanned aerial vehicle. This aircraft may be configured as a vertical take-off and landing (VTOL) aircraft or a short take-off and vertical landing (STOVL) aircraft. The aircraft propulsion system 20 of FIG. 1, for example, is configured to generate power for first direction propulsion (e.g., propulsive thrust) during a first mode of operation and to generate power for second direction propulsion (e.g., propulsive lift) during a second mode of operation, where the first direction is different than (e.g., angularly offset from) the second direction. The first mode may be a horizontal (e.g., forward) flight mode where the first direction propulsion is substantially horizontal (e.g., within 5 degrees, 10 degrees, etc. of a horizontal axis) propulsive thrust. The second mode may be a vertical flight and/or hover mode where the second direction propulsion is substantially vertical (e.g., within 5 degrees, 10 degrees, etc. of a vertical axis) propulsive lift. The aircraft propulsion system 20, of course, may also be configured to generate both the first direction (e.g., horizontal) propulsion and the second direction (e.g., vertical) propulsion during a third (e.g., transition) mode of operation. The aircraft propulsion system 20 of FIG. 1 includes at least one bladed first propulsor rotor 22, at least one bladed second propulsor rotor 24 and a gas turbine engine core 26 configured to rotatably drive the first propulsor rotor 22 and the second propulsor rotor 24.

The first propulsor rotor 22 may be configured as a ducted rotor such as a fan rotor. The first propulsor rotor 22 of FIG. 1 is rotatable about a first rotor axis 28. This first rotor axis 28 is an axial centerline of the first propulsor rotor 22 and may be horizontal when the aircraft is on ground. The first propulsor rotor 22 includes at least a first rotor disk 29 and a plurality of first rotor blades 30 (on visible in FIG. 1); e.g., fan blades. The first rotor blades 30 are distributed circumferentially around the first rotor disk 29 in an annular array. Each of the first rotor blades 30 is connected to and projects radially (relative to the first rotor axis 28) out from the first rotor disk 29.

The second propulsor rotor 24 may be configured as an open rotor such as a propeller rotor or a helicopter (e.g., main) rotor. Of course, in other embodiments, the second propulsor rotor 24 may alternatively be configured as a ducted rotor such as a fan rotor; e.g., see dashed line duct. The second propulsor rotor 24 of FIG. 1 is rotatable about a second rotor axis 32. This second rotor axis 32 is an axial centerline of the second propulsor rotor 24 and may be vertical when the aircraft is on the ground. The second rotor axis 32 is angularly offset from the first rotor axis 28 by an included angle 34; e.g., an acute angle or a right angle. This included angle 34 may be between sixty degrees (60°) and ninety degrees (90°); however, the present disclosure is not limited to such an exemplary relationship. The second propulsor rotor 24 includes at least a second rotor disk 36 and a plurality of second rotor blades 38; e.g., open rotor blades. The second rotor blades 38 are distributed circumferentially around the second rotor disk 36 in an annular array. Each of the second rotor blades 38 is connected to and projects radially (relative to the second rotor axis 32) out from the second rotor disk 36.

The engine core 26 extends axially along a core axis 40 between a forward, upstream airflow inlet 42 and an aft, downstream exhaust 44. The core axis 40 may be an axial centerline of the engine core 26 and may be horizontal when the aircraft is on the ground. This core axis 40 may be parallel (e.g., coaxial) with the first rotor axis 28 and, thus, angularly offset from the second rotor axis 32. The engine core 26 of FIG. 1 includes a compressor section 46, a combustor section 47 and a turbine section 48. The turbine section 48 of FIG. 1 includes a high pressure turbine (HPT) section 48A and a low pressure turbine (LPT) section 48B (also sometimes referred to as a power turbine section).

The engine sections 46-48B are arranged sequentially along the core axis 40 within an engine housing 50. This engine housing 50 includes an inner case 52 (e.g., a core case) and an outer case 54 (e.g., a fan case). The inner case 52 may house one or more of the engine sections 46-48B; e.g., the engine core 26. The outer case 54 may house the first propulsor rotor 22. The outer case 54 of FIG. 1 also axially overlaps and extends circumferentially about (e.g., completely around) the inner case 52 thereby at least partially forming a bypass flowpath 56 radially between the inner case 52 and the outer case 54.

Each of the engine sections 46, 48A and 48B includes a bladed rotor 58-60 within that respective engine section 46, 48A, 48B. Each of these bladed rotors 58-60 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The compressor rotor 58 is connected to the HPT rotor 59 through a high speed shaft 62. At least (or only) these engine components 58, 59 and 62 collectively form a high speed rotating structure 64. This high speed rotating structure 64 is rotatable about the core axis 40. The LPT rotor 60 is connected to a low speed shaft 66. At least (or only) these engine components collectively form a low speed rotating structure 68. This low speed rotating structure 68 is rotatable about the core axis 40. The low speed rotating structure 68 and, more particularly, its low speed shaft 66 may project axially through a bore of the high speed rotating structure 64 and its high speed shaft 62.

The aircraft propulsion system 20 of FIG. 1 includes a powertrain 70 that couples the low speed rotating structure 68 to the first propulsor rotor 22 and that couples the low speed rotating structure 68 to the second propulsor rotor 24. The powertrain 70 of FIG. 1 includes a geartrain 72, an electric machine 74, a transmission 76 and a gearing 78; e.g., bevel gearing. The powertrain 70 of FIG. 1 also includes one or more shafts 80-83 and/or other torque transmission devices for coupling the geartrain 72 to the first propulsor rotor 22 and the second propulsor rotor 24.

Figure 2:
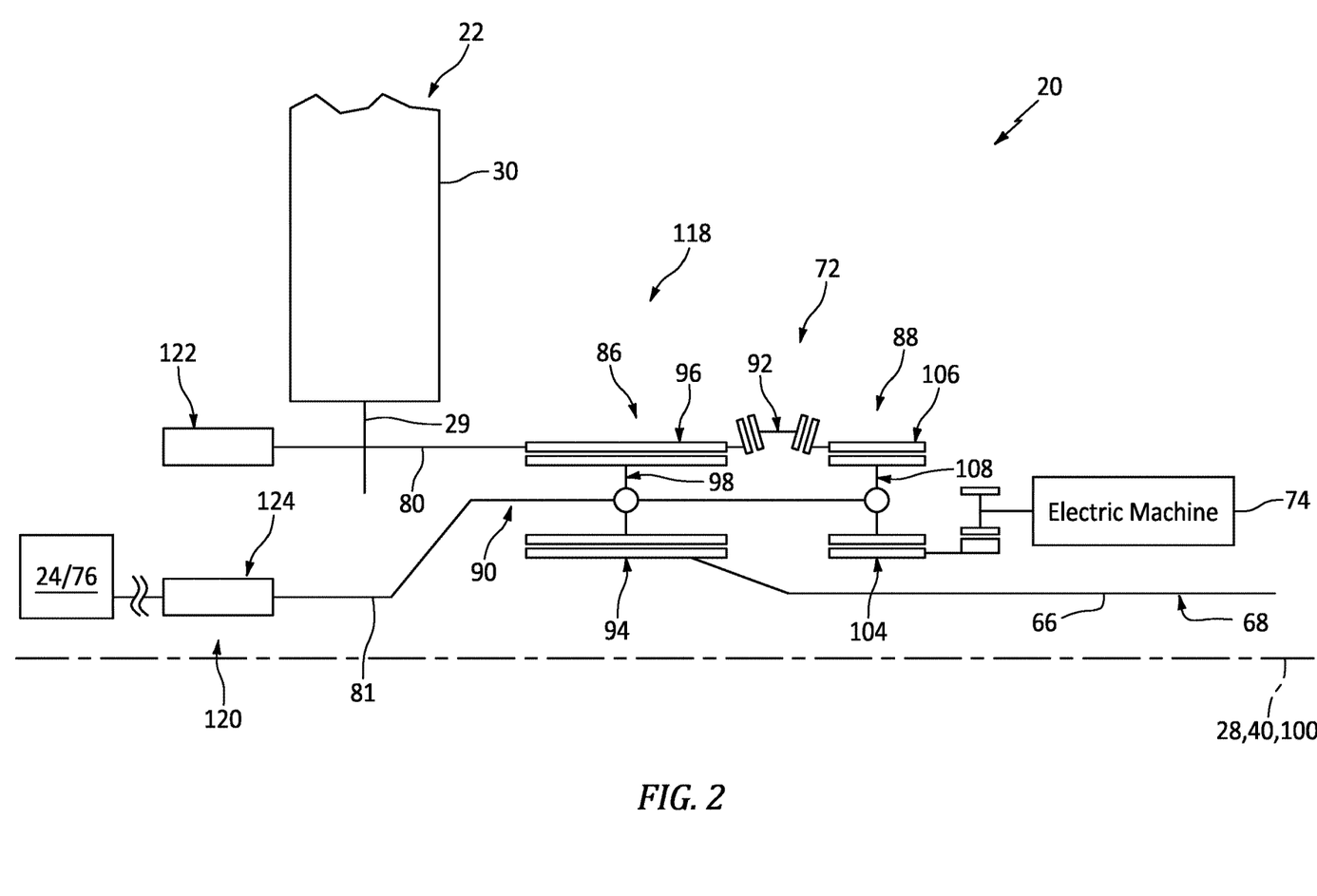
FIG. 2 is a partial, schematic illustration of a portion of the aircraft propulsion system about a propulsion control system.

Referring to FIG. 2, the geartrain 72 may be configured as a biased torque differential. This geartrain 72 includes a first gear system 86, a second gear system 88, a gear carrier 90 and one or more idler gears 92 (one visible in FIG. 2). Each of these gear systems 86 and 88 may be configured as an epicyclic gear system. The first gear system 86 is configured to transfer power from the low speed rotating structure 68 to the first propulsor rotor 22 and/or the second propulsor rotor 24 (see also FIG. 1). The second gear system 88 is configured to facilitate locking (e.g., stopping, preventing) rotation of the second propulsor rotor 24 about its second rotor axis 32 during the first mode of operation and/or locking (e.g., stopping, preventing) rotation of the first propulsor rotor 22 about its first rotor axis 28 during the second mode of operation.

Figure 3A:
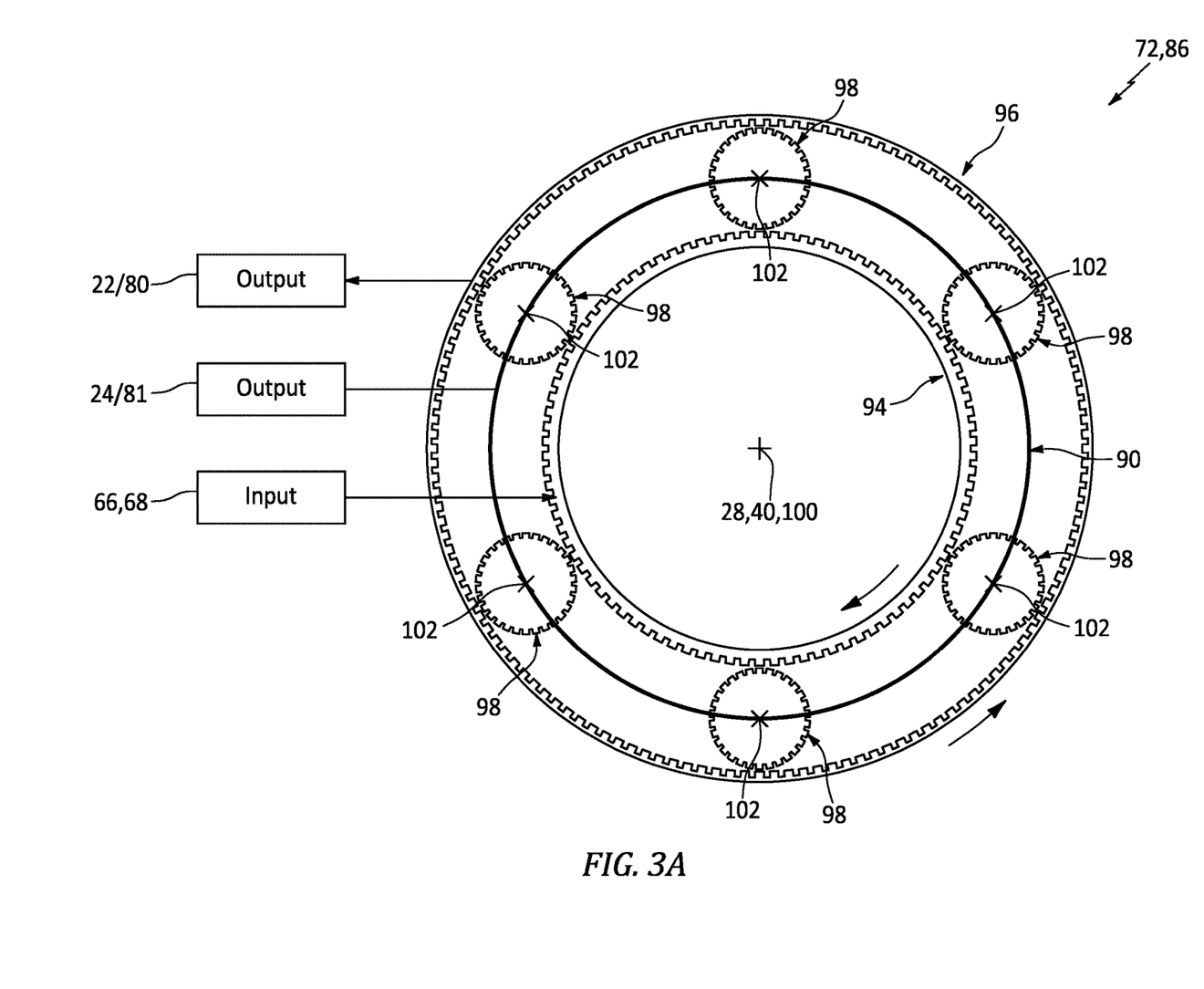
FIG. 3A is a schematic illustration of a first gear system coupled between an input and multiple outputs, where the first gear system is depicted operating in a star system mode.
Figure 3B:
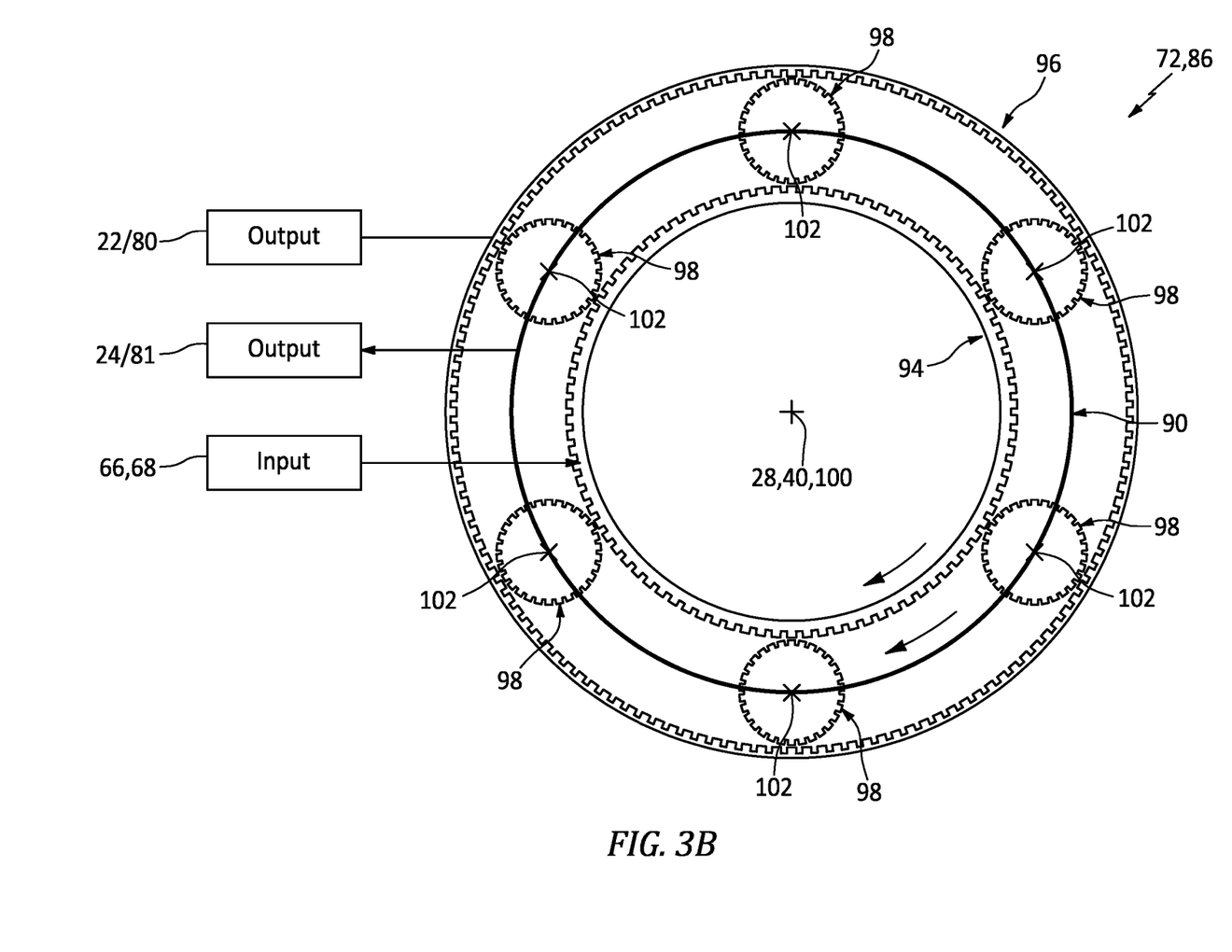
FIG. 3B is a schematic illustration of the first gear system coupled between the input and the outputs, where the first gear system is depicted operating in a planetary system mode.
Figure 3C:
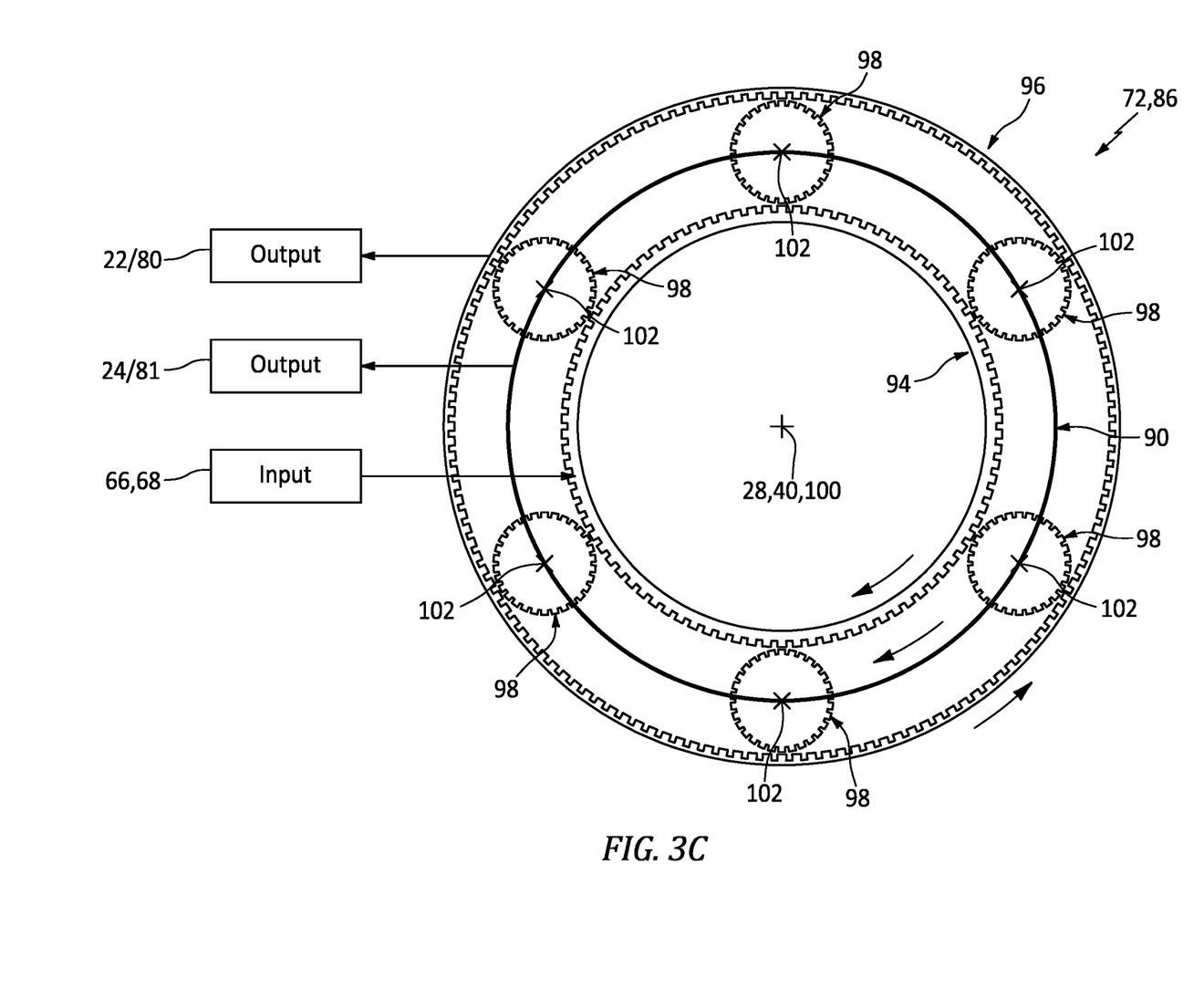
FIG. 3C is a schematic illustration of the first gear system coupled between the input and the outputs, where the first gear system is depicted operating in an open system mode.

Referring to FIGS. 3A-C, the first gear system 86 may be operable as a star gear system during a star system mode of operation; e.g., see FIG. 3A. The first gear system 86 may be operable as a planetary gear system during a planetary system mode of operation; e.g., see FIG. 3B. The first gear system 86 may be operable as open gear system during an open mode of operation; e.g., see FIG. 3C.

The first gear system 86 of FIGS. 3A-C includes a first sun gear 94 (e.g., an inner gear), a first ring gear 96 (e.g., an outer gear) and one or more first intermediate gears 98 (e.g., planet or star gears). The first sun gear 94 is rotatable about a centerline axis 100 of the geartrain 72, which centerline axis 100 may be parallel (e.g., coaxial) with the axis 28, 40. The first ring gear 96 is rotatable about the centerline axis 100 during at least (or only) the star system mode of operation (see FIG. 3A). This first ring gear 96 extends circumferentially around (e.g., circumscribes) the first sun gear 94 and an annular array of the first intermediate gears 98. The first intermediate gears 98 are arranged circumferentially about the centerline axis 100 in the annular array. Each of the first intermediate gears 98 is radially between and meshed with the first sun gear 94 and the first ring gear 96. Each of the first intermediate gears 98 is rotatable about a respective first intermediate gear axis 102, and is rotatably mounted to and supported by the carrier 90. The carrier 90 is rotatable about the centerline axis 100 during at least (or only) the planetary system mode of operation (see FIG. 3B).

Figure 4:
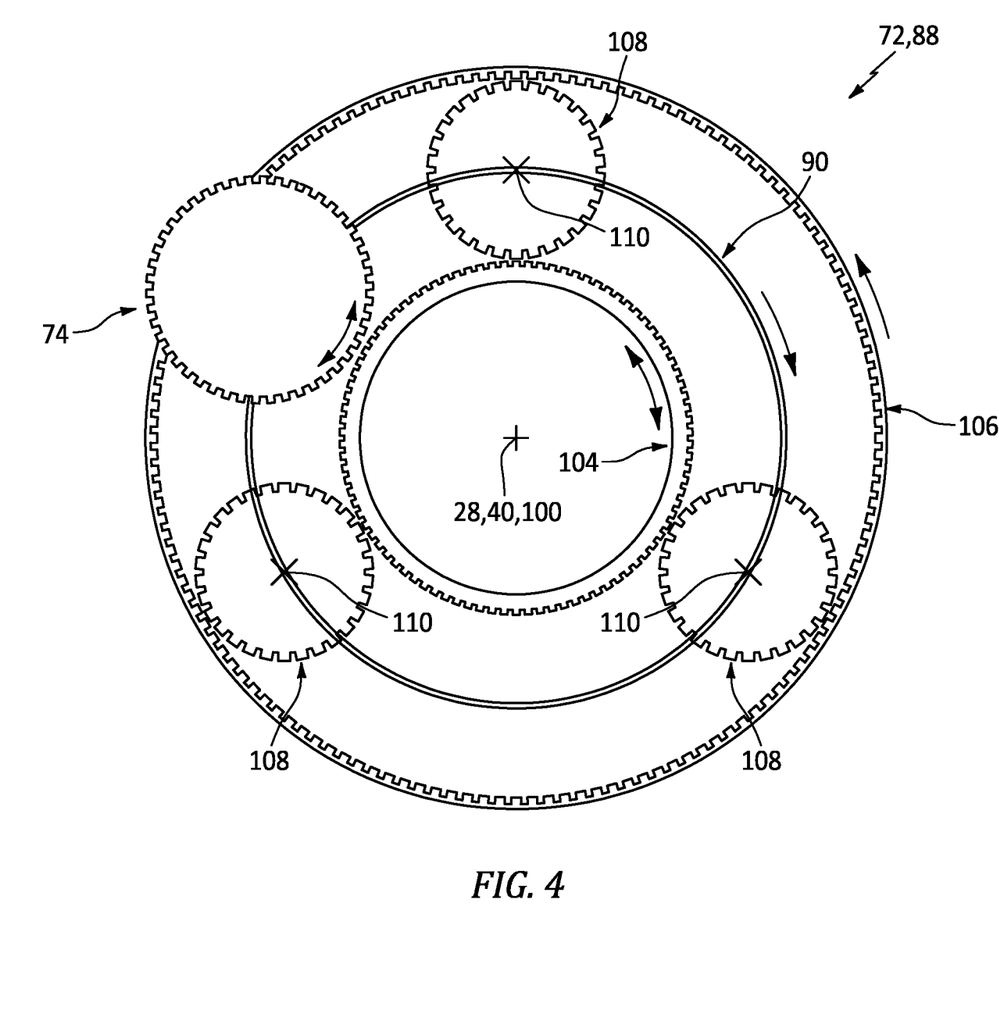
FIG. 4 is a schematic illustration of a second gear system arranged with an electric machine.

Referring to FIG. 4, the second gear system 88 includes a second sun gear 104 (e.g., an inner gear), a second ring gear 106 (e.g., an outer gear) and one or more second intermediate gears 108 (e.g., planet or star gears). The second sun gear 104 is rotatable about the centerline axis 100. The second ring gear 106 is rotatable about the centerline axis 100. This second ring gear 106 extends circumferentially around (e.g., circumscribes) the second sun gear 104 and an annular array of the second intermediate gears 108. The second intermediate gears 108 are arranged circumferentially about the centerline axis 100 in the annular array. Each of the second intermediate gears 108 is radially between and meshed with the second sun gear 104 and the second ring gear 106. Each of the second intermediate gears 108 is rotatable about a respective second intermediate gear axis 110, and is rotatably mounted to and supported by the carrier 90.

Referring to FIG. 2, the idler gears 92 are arranged circumferentially about the centerline axis 100 in the annular array. These idler gears 92 are configured to couple the first ring gear 96 and the second ring gear 106 together. Each of the idler gears 92 of FIG. 2, for example, is axially between and meshed with the first ring gear 96 and the second ring gear 106.

The electric machine 74 of FIG. 2 is coupled to the second sun gear 104, where the low speed shaft 66 provides a power input for the geartrain 72. This electric machine 74 is configurable as an electric motor. For example, during a motor mode of operation, the electric machine 74 converts electricity received from a power source (e.g., a generator, one or more batteries, etc.) into mechanical power. This mechanical power is used for driving rotation of the second sun gear 104. It is contemplated, however, the electric machine 74 may also be (but, need not be) configurable as an electric generator. For example, during a generator mode of operation, the electric machine 74 may convert mechanical power received through the geartrain 72 and its second gear system 88 into electricity. This electricity may be utilized for various purposes within the aircraft propulsion system 20 and/or for various purposes outside of the aircraft propulsion system 20. It is further contemplated that the electric machine 74 may be coupled to the second sun gear 104 through a gear train (and/or other device(s)) such that electric machine 74 may reside remotely from sun gear 104; for example, mounted to the inner case 52 or the outer case 54 of FIG. 1.

The first sun gear 94 is coupled to the low speed rotating structure 68 and its low speed shaft 66, where the low speed shaft 66 provides another power input for the geartrain 72. The first ring gear 96 is coupled to the first propulsor rotor 22 through the first propulsor shaft 80, where the first propulsor shaft 80 provides a first power output from the geartrain 72. The carrier 90 and, thus, the first intermediate gears 98 (and the second intermediate gears 108) are coupled to the second propulsor rotor 24 through the system elements 90, 81, 76, 82, 78 and 83 (see FIG. 1), where the geartrain output shaft 81 provides a second power output from the geartrain 72. More particularly, the carrier 90 of FIG. 2 is coupled to the transmission 76 through the geartrain output shaft 81.

Referring to FIG. 1, an output of the transmission 76 is connected to the gearing 78 through the transmission output shaft 82. This transmission 76 may be configured to selectively couple (e.g., transfer mechanical power between) the geartrain output shaft 81 and the transmission output shaft 82. During the first mode of operation, for example, the transmission 76 may be configured to decouple the geartrain output shaft 81 from the transmission output shaft 82, thereby decoupling the low speed rotating structure 68 from the second propulsor rotor 24. During the second mode of operation (and the third mode of operation), the transmission 76 may be configured to couple the geartrain output shaft 81 with the transmission output shaft 82, thereby coupling the low speed rotating structure 68 with the second propulsor rotor 24. The transmission 76 may be configured as a clutchless transmission.

An output of the gearing 78 is connected to the second propulsor rotor 24 through the second propulsor shaft 83. This gearing 78 provides a coupling between the transmission output shaft 82 rotating about the axis 28, 40, 100 and the second propulsor shaft 83 rotating about the second rotor axis 32. The gearing 78 may also provide a speed change mechanism between the transmission output shaft 82 and the second propulsor shaft 83. The gearing 78, however, may alternatively provide a 1:1 rotational coupling between the transmission output shaft 82 and the second propulsor shaft 83 such that these shafts 82 and 83 rotate at a common (e.g., the same) speed. Furthermore, in some embodiments, the gearing 78 and the transmission output shaft 82 may be omitted where the functionality of the gearing 78 is integrated into the transmission 76. In still other embodiments, the transmission 76 may be omitted where decoupling of the second propulsor rotor 24 is not required.

During operation of the aircraft propulsion system 20, air enters the engine core 26 through the airflow inlet 42. This air is directed into a core flowpath 112 which extends sequentially through the compressor section 46, the combustor section 47, the HPT section 48A and the LPT section 48B to the exhaust 44. The air within this core flowpath 112 may be referred to as core air.

The core air is compressed by the compressor rotor 58 and directed into a (e.g., annular) combustion chamber 114 of a (e.g., annular) combustor in the combustor section 47. Fuel is injected into the combustion chamber 114 through one or more fuel injectors 116 (one visible in FIG. 1) and mixed with the compressed core air to provide a fuel-air mixture. This fuel-air mixture is ignited and combustion products thereof flow through and sequentially cause the HPT rotor 59 and the LPT rotor 60 to rotate. The rotation of the HPT rotor 59 drives rotation of the high speed rotating structure 64 and its compressor rotor 58. The rotation of the LPT rotor drives rotation of the low speed rotating structure 68. The rotation of the low speed rotating structure 68 drives rotation of the first propulsor rotor 22 through the geartrain 72 during a select mode or modes of operation; e.g., the first and the third modes of operation. The rotation of the low speed rotating structure 68 drives rotation of the second propulsor rotor 24 through the geartrain 72 during a select mode or modes of operation; e.g., the second and the third modes of operation. During the first mode of operation, the transmission 76 may decouple the low speed rotating structure 68 from the second propulsor rotor 24 such that the low speed rotating structure 68 does not drive rotation of the second propulsor rotor 24. The second propulsor rotor 24 may thereby be stationary (or windmill) during the first mode of operation.

During the first and third modes of operation, the rotation of the first propulsor rotor 22 propels bypass air (separate from the core air) through the aircraft propulsion system 20 and its bypass flowpath 56 to provide the first direction propulsion; e.g., the forward, horizontal thrust. During the second and third modes of operation, the rotation of the second propulsor rotor 24 propels additional air (separate from the core air and the bypass air) to provide the second direction propulsion; e.g., vertical lift. The aircraft may thereby takeoff, land and/or otherwise hover during the second and third modes of operation, and the aircraft may fly forward or otherwise move during the first and the third modes of operation.

During each mode of operation, the low speed rotating structure 68 is coupled to the first propulsor rotor 22 through the geartrain 72. As described above, rotation of the first propulsor rotor 22 generates horizontal thrust during the first and the third modes of operation to propel the aircraft horizontally forward. However, generating such horizontal thrust (or significant amounts of horizontal thrust) may hinder and/or be less advantageous to certain aircraft takeoff, landing and/or hovering maneuvers during the second mode of operation. Furthermore, producing horizontal thrust with the first propulsor rotor 22 during the second mode of operation may also take away engine core power that could otherwise be provided to the second propulsor rotor 24 for vertical aircraft lift. The aircraft propulsion system 20 of FIG. 1 is therefore configured with a propulsion control system 118 (see also FIG. 2) operable to (A) slow and/or stop the rotation of the first propulsor rotor 22 during the second and/or the third modes of operation, and (B) slow and/or stop the rotation of the second propulsor rotor 24 during the first and the third modes of operation. This propulsion control system 118 may also provide a clutch functionality for the transmission 76.

The propulsion control system 118 of FIG. 2 includes the geartrain 72, the electric machine 74 and a lock system 120. The lock system 120 of FIG. 2 includes one or more lock devices 122 and 124.

The first lock device 122 is configured to selectively lock (e.g., stop, prevent) rotation of the first ring gear 96 and/or any one or more system elements 22 and 80 coupled to the first ring gear 96 during, for example, the second mode of operation. The first lock device 122 is configured to selectively unlock (e.g., permit, facilitate) rotation of the first ring gear 96 and/or any one or more system elements 22, 80, 92, and 106 coupled to and driven by the first ring gear 96 during, for example, the first and the third modes of operation. The second lock device 124, on the other hand, is configured to selectively lock (e.g., stop, prevent) rotation of the carrier 90 and/or any one or more system elements 24, 76, 78 and 81-83 (see also FIG. 1) coupled to the carrier 90 during, for example, the first mode of operation. The second lock device 124 is configured to selectively unlock (e.g., permit, facilitate) rotation of the carrier 90 and/or any one or more system elements 24, 76, 78 and 81-83 (see also FIG. 1) coupled to and driven by the carrier 90 during, for example, the second and the third modes of operation.

Figure 5:
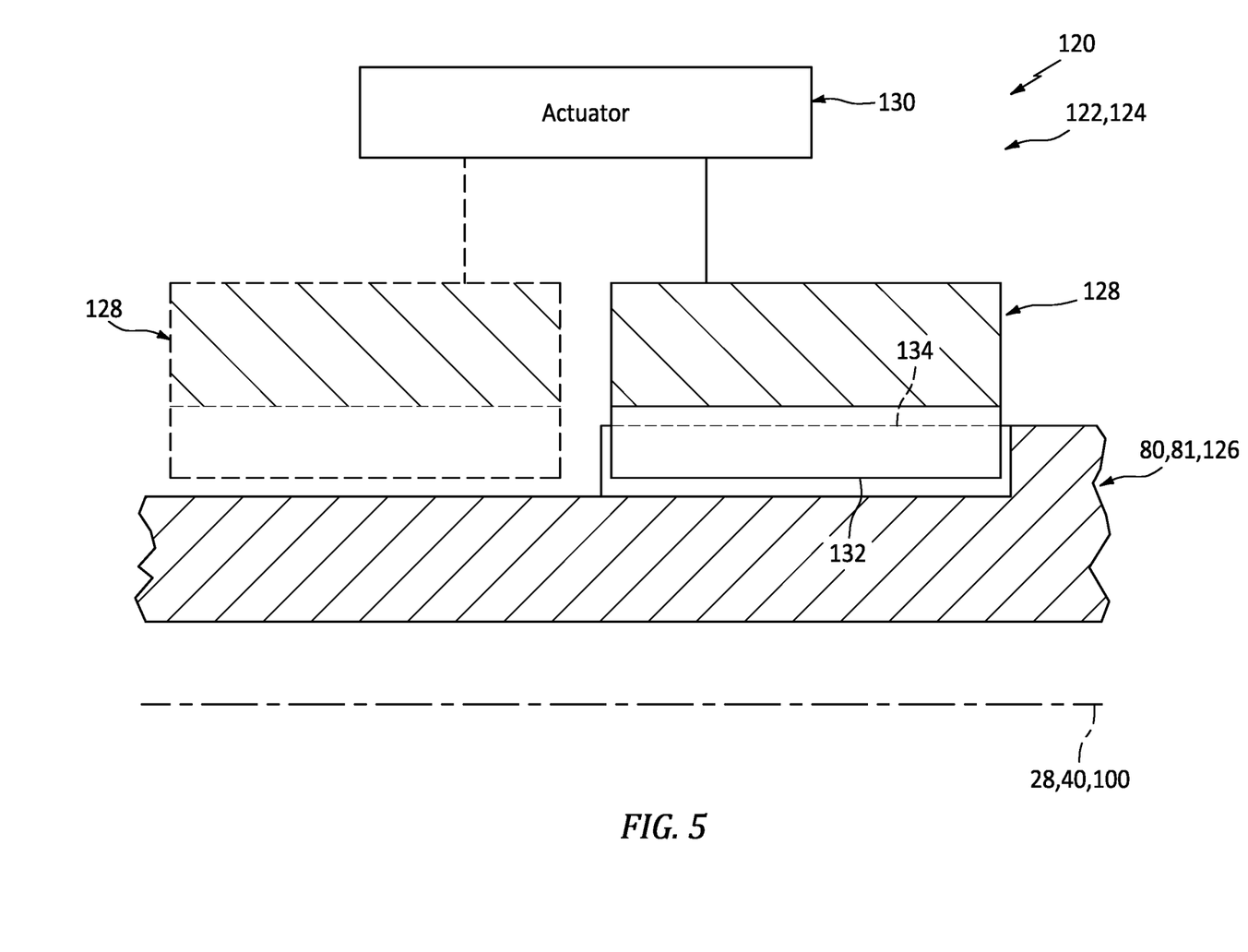
FIG. 5 is a partial side sectional schematic illustration of a lock device.

Referring to FIG. 5, each of the lock devices 122 and 124 may be configured as a splined coupling. More particularly, each of the lock devices 122 and 124 include an inner lock element 126 (e.g., a splined shaft), an outer lock element 128 (e.g., a splined sleeve) and an actuator 130. The inner lock element 126 is rotatable about the axis 28, 40, 100. The outer lock element 128 is rotational fixed about the axis 28, 40, 100. However, the actuator 130 is configured to move (e.g., axially translate) the outer lock element 128 along the axis 28, 40, 100 and the inner lock element 126 between an unlocked position (see dashed line in FIG. 5) and a locked position (see solid line in FIG. 5; see also FIG. 6). At the unlocked position, splines 132 of the outer lock element 128 are disengaged (e.g., spaced) from splines 134 of the inner lock element 126. At the locked position, the splines 132 of the outer lock element 128 are engaged (e.g., meshed) with the splines 134 of the inner lock element 126 (see also FIG. 6). With this arrangement, when respective lock device 122, 124 is unlocked and its outer lock element 128 is in the unlocked position, the inner lock element 126 may rotate (e.g., freely, unencumbered by the outer lock element 128) about the axis 28, 40, 100. However, when the respective lock device 122, 124 is locked and its outer lock element 128 is in the locked position of FIG. 6, the outer lock element 128 is meshed with the inner lock element 126 and prevents rotation of the inner lock element 126 about the axis 28, 40, 100.

Referring to FIGS. 2 and 5, the inner lock element 126 of the first lock device 122 may be configured as part of or may be attached (directly or indirectly) to the first propulsor shaft 80, or any other one of the system elements 22, 96, 92, 106 of FIG. 2. The inner lock element 126 of the second lock device 124 may be configured as part of or may be attached (directly or indirectly) to the geartrain output shaft 81, or any other one of the system elements 24, 76, 78, 82, 83 and 90 of FIGS. 1 and 2.

Figure 6:
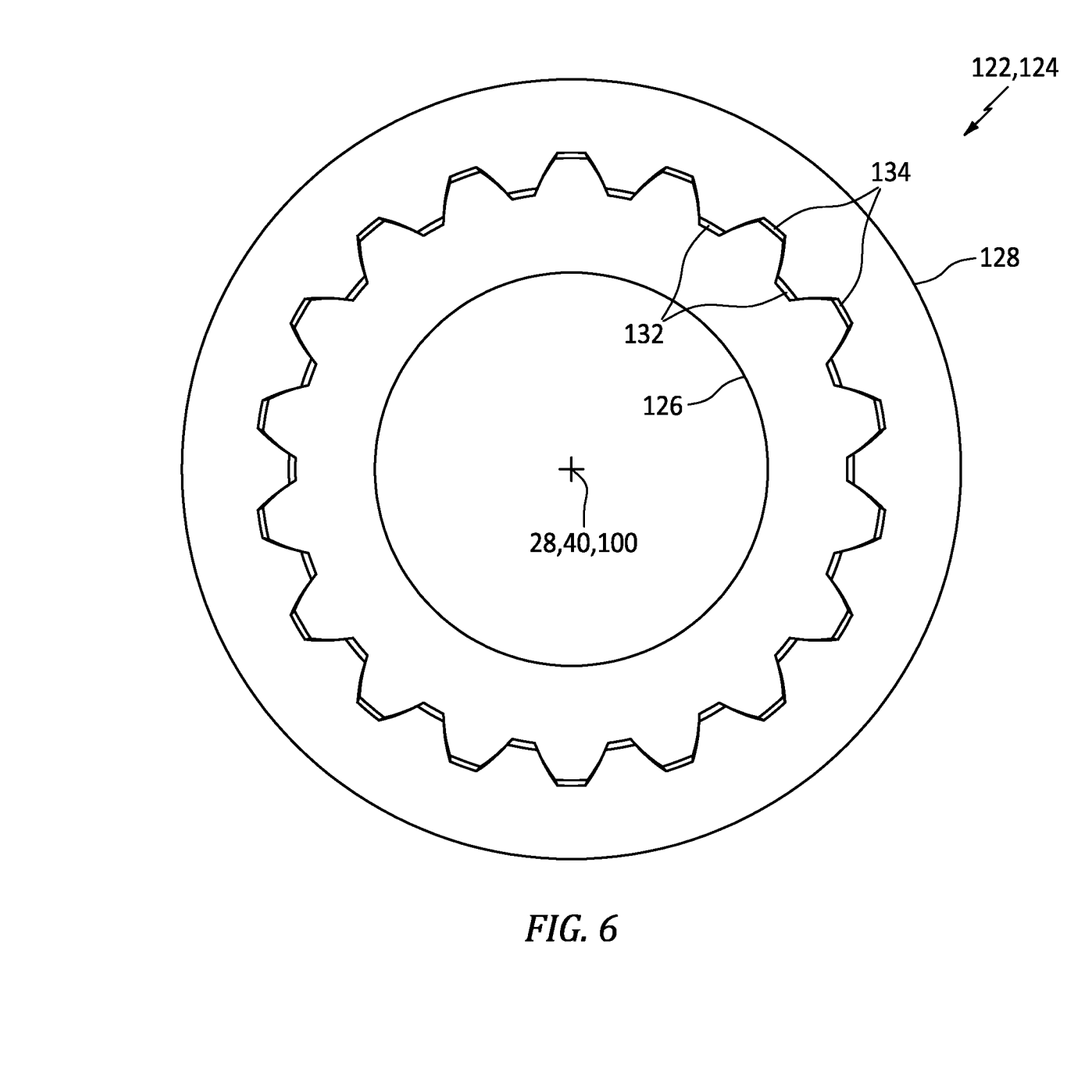
FIG. 6 is a cross-sectional illustration of the lock device.

While the inner lock element 126 of FIGS. 5 and 6 is described above as the rotating element and the outer lock element 128 is described as the rotationally fixed element, the operation of these elements 126 and 128 may be switched in other embodiments. In particular, the inner lock element 126 may alternatively be configured as the rotationally fixed element and axially translatable by the actuator 130, and the outer lock element 128 may be configured as the rotating element. Furthermore, various other types of rotational lock devices are known in the art, and the present disclosure is not limited to any particular ones thereof.

During operation of the propulsion control system 118 of FIG. 2, the electric machine 74 may be used to facilitate operation of the lock system 120. For example, where both the first lock device 122 and the second lock device 124 are disengaged (e.g., unlocked), the first sun gear 94 and, more particularly, the low speed rotating structure 68 (see FIG. 1) may drive rotation of the first ring gear 96 and the carrier 90 (in opposing directions) about the centerline axis 100 (see FIG. 3C). To facilitate engagement of the first lock device 122, the electric machine 74 of FIG. 2 (see also FIG. 4) is operated as the electric motor to drive rotation of the second sun gear 104 in a first direction about the centerline axis 100. Increasing a rotational speed of the second sun gear 104 in the first direction decreases a rotational speed of the first ring gear 96 about the centerline axis 100. The electric machine 74 may thereby increase the rotational speed of the second sun gear 104 in the first direction to drive the rotational speed of the first ring gear 96 towards (e.g., down to) a zero rotational speed. Once the first sun gear 94 is at a zero rotational speed about the centerline axis 100 (e.g., rotationally fixed), the first lock device 122 of FIGS. 5 and 6 may be engaged. The electric machine 74 may then be turned off (or otherwise used), and the first lock device 122 of FIG. 2 may maintain the first ring gear 96 rotationally fixed. While the electric machine 74 is off, the second sun gear 104 may rotate (e.g., windmill) or be stopped via an optional brake. With this arrangement, the first propulsor rotor 22 is rotationally fixed, the second propulsor rotor 24 is rotatably driven by the low speed rotating structure 68 through the geartrain 72 and the aircraft propulsion system 20 is operated in its second mode of operation.

To switch from the second mode of operation to the first mode of operation, the first lock device 122 may be disengaged. The low speed rotating structure 68 may thereby rotationally drive both the first propulsor rotor 22 and the second propulsor rotor 24 through the geartrain 72. To facilitate engagement of the second lock device 124, the electric machine 74 of FIG. 2 (see also FIG. 4) is operated as the electric motor to drive rotation of the second sun gear 104 in a second direction about the centerline axis 100 which is opposite the first direction. Increasing the rotational speed of the second sun gear 104 in the second direction decreases a rotational speed of the carrier 90 about the centerline axis 100. The electric machine 74 may thereby increase the rotational speed of the second sun gear 104 in the second direction to drive the rotational speed of the carrier 90 towards (e.g., down to) a zero rotational speed. Once the carrier 90 is at a zero rotational speed about the centerline axis 100 (e.g., rotationally fixed), the second lock device 124 of FIGS. 5 and 6 may be engaged. The electric machine 74 may then be turned off (or otherwise used), and the second lock device 124 of FIG. 2 may maintain the carrier 90 rotationally fixed. While the electric machine 74 is off, the second sun gear 104 may rotate (e.g., windmill) or be stopped via the optional brake. With this arrangement, the second propulsor rotor 24 may be rotationally fixed, the first propulsor rotor 22 is rotatably driven by the low speed rotating structure 68 through the geartrain 72 and the aircraft propulsion system 20 is operated in its first mode of operation.

During the first mode of operation where the first lock device 122 is disengaged and the second lock device 124 is engaged, the geartrain 72 of FIG. 3A operates in its star system mode and is configured as the star geartrain. During the second mode of operation of FIG. 2 where the first lock device 122 is engaged and the second lock device 124 is disengaged, the geartrain 72 operates in its planetary system mode and is configured as the planetary geartrain. During the third mode of operation of FIG. 2 where the first lock device 122 and the second lock device 124 are both disengaged, the geartrain 72 of FIG. 3C operates in its open system mode and is configured as the open geartrain where power is transferred from the low speed rotating structure 68 to both shafts 80 and 81. The aircraft propulsion system 20 may be operated in the third mode of operation while transitioning between the first and the second modes of operation.

During the star system mode of FIG. 3A, the geartrain 72 may transfer none of the power received from the low speed rotating structure 68 to the second propulsor rotor 24 since the carrier 90 is stationary. The geartrain 72 may therefore transfer (e.g., all, minus powertrain losses) power received from the low speed rotating structure 68 to the first propulsor rotor 22 to generate the first direction propulsive force; e.g., forward, horizontal thrust. By contrast, during the planetary system mode of FIG. 3B, the geartrain 72 may transfer none of the power received from the low speed rotating structure 68 to the first propulsor rotor 22 since the first ring gear 96 is stationary. The geartrain 72 may therefore transfer (e.g., all, minus powertrain losses) power received from the low speed rotating structure 68 to the second propulsor rotor 24 to generate the second direction propulsive force; e.g., vertical lift. The propulsion control system 118 of the present disclosure may thereby facilitate selective power distribution from the low speed rotating structure 68 to the first propulsor rotor 22 and the second propulsor rotor 24.

Providing this selective power distribution may increase aircraft propulsion system efficiency and improve aircraft handling during at least the first and the second modes of operation.

Figure 7:
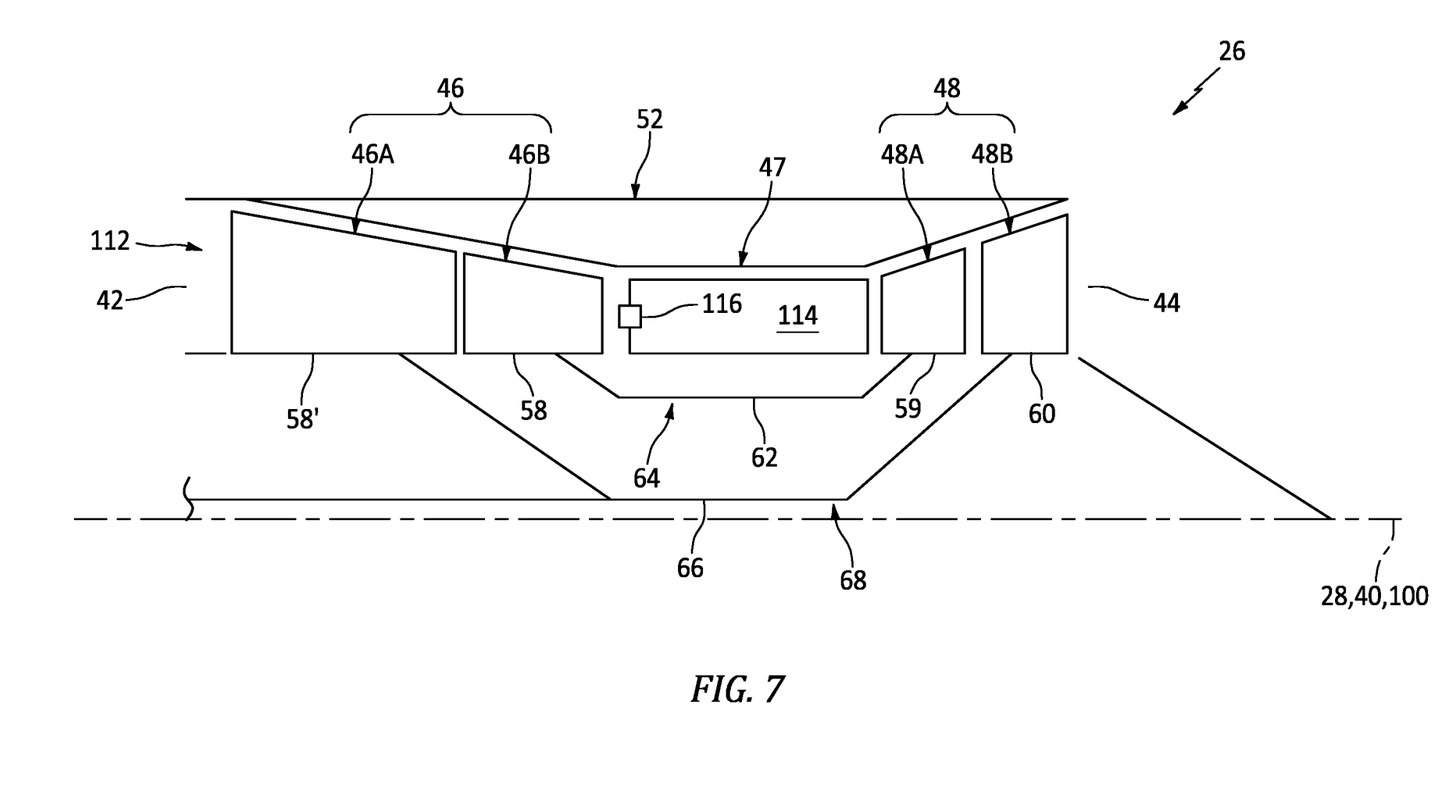
FIG. 7 is a partial schematic illustration of a gas turbine engine core with multi-staged compressor rotors.

In some embodiments, referring to FIG. 1, the low speed rotating structure 68 may be configured without a compressor rotor. In other embodiments, referring to FIG. 7, the low speed rotating structure 68 may include a low pressure compressor (LPC) rotor 58' arranged within a low pressure compressor (LPC) section 46A of the compressor section 46. In such embodiments, the compressor rotor 58 may be a high pressure compressor (HPC) rotor within a high pressure compressor (HPC) section 46B of the compressor section 46.

Figure 8:
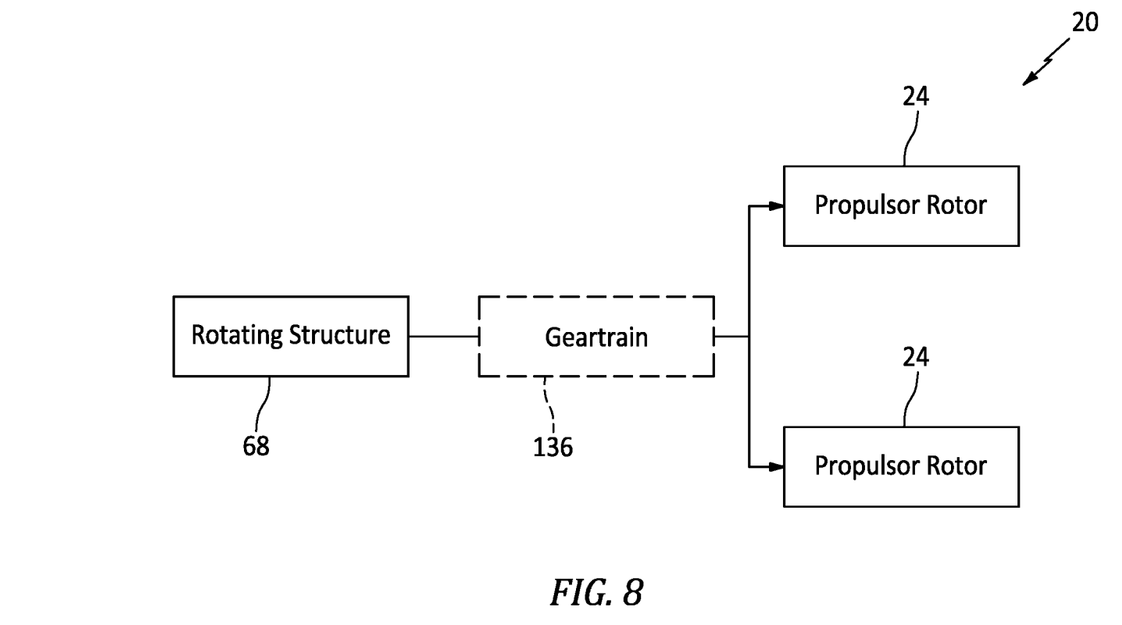
FIG. 8 is a partial schematic illustration of a rotating structure coupled to and driving multiple propulsor rotors for generating propulsive lift.

The engine core 26 (e.g., see FIG. 1) may have various configurations other than those described above. The engine core 26, for example, may be configured with a single spool, with two spools (e.g., see FIG. 1), or with more than two spools. The engine core 26 may be configured with one or more axial flow compressor sections, one or more radial flow compressor sections, one or more axial flow turbine sections and/or one or more radial flow turbine sections. The engine core 26 may be configured with any type or configuration of annular, tubular (e.g., CAN), axial flow and/or reverser flow combustor. The present disclosure therefore is not limited to any particular types or configurations of gas turbine engine cores. Furthermore, it is contemplated the engine core 26 of the present disclosure may drive more than the two propulsors 22 and 24. The aircraft propulsion system 20, for example, may include two or more of the first propulsor rotors 22 and/or two or more of the second propulsor rotors 24. For example, the aircraft propulsion system 20 of FIG. 8 includes multiple second propulsor rotors 24 rotatably driven by the low speed rotating structure 68. These second propulsor rotors 24 may rotate about a common axis. Alternatively, each second propulsor rotor 24 may rotate about a discrete axis where, for example, the second propulsor rotors 24 are laterally spaced from one another and coupled to the low speed rotating structure 68 through a power splitting geartrain 136.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft, comprising:
   a carrier;
   a first gear system including a first sun gear, a first ring gear and a plurality of first intermediate gears, each of the plurality of first intermediate gears between and meshed with the first sun gear and the first ring gear, and each of the plurality of first intermediate gears rotatably mounted to the carrier;
   a second gear system including a second sun gear, a second ring gear and a plurality of second intermediate gears, each of the plurality of second intermediate gears between and meshed with the second sun gear and the second ring gear, and each of the plurality of second intermediate gears rotatably mounted to the carrier; and
   an idler gear coupling the first ring gear to the second ring gear.

2. The assembly of claim 1, wherein the carrier, the first sun gear, the first ring gear, the second sun gear and the second ring gear are each rotatable about a centerline axis.

3. The assembly of claim 1, wherein the idler gear is arranged between and is meshed with the first ring gear and the second ring gear.

4. The assembly of claim 1, further comprising an electric machine configured to drive rotation of the second sun gear about a centerline axis.

5. The assembly of claim 4, wherein the electric machine is configured to drive the first ring gear down to a zero rotational speed about the centerline axis.

6. The assembly of claim 5, further comprising a lock device configured to lock rotation of the first ring gear about the centerline axis when the first ring gear is at the zero rotational speed.

7. The assembly of claim 6, wherein the lock device comprises a splined coupling.

8. The assembly of claim 4, wherein the electric machine is configured to drive the carrier down to a zero rotational speed about the centerline axis.

9. The assembly of claim 8, further comprising a lock device configured to lock rotation of the carrier about the centerline axis when the carrier is at the zero rotational speed.

10. The assembly of claim 9, wherein the lock device comprises a splined coupling.

11. The assembly of claim 1, further comprising:
    a gas turbine engine core including a compressor section, a combustor section, a turbine section and a rotating structure;
    the rotating structure comprising a turbine rotor within the turbine section; and
    the rotating structure coupled to and configured to drive rotation of the first sun gear.

12. The assembly of claim 1, further comprising:
    a first propulsor rotor coupled to and configured to be rotatably driven by the first ring gear; and
    a second propulsor rotor coupled to and configured to be rotatably driven by the carrier.

13. The assembly of claim 12, wherein
    the first propulsor rotor is rotatable about a first axis; and
    the second propulsor rotor is rotatable about a second axis that is angularly offset from the first axis.

14. The assembly of claim 12, wherein
    the first propulsor rotor is configured to generate propulsive force in a first direction; and
    the second propulsor rotor is configured to generate propulsive force in a second direction that is different than the first direction.

15. The assembly of claim 12, wherein at least one of
    the first propulsor rotor comprises a ducted rotor; or
    the second propulsor rotor comprises an open rotor.

16. An assembly for an aircraft, comprising:
    a rotating structure comprising a turbine rotor;
    an epicyclic gear system including a sun gear, a ring gear and a plurality of intermediate gears, the sun gear rotatably driven by the rotating structure, and each of the plurality of intermediate gears between and meshed with the sun gear and the ring gear;
    a carrier rotatably supporting each of the plurality of intermediate gears;
    a first propulsor rotor coupled to the ring gear;
    a second propulsor rotor coupled to the carrier; and an electric machine coupled to the first propulsor rotor and the second propulsor rotor through the epicyclic gear system, wherein the assembly is configured to at least one of stop rotation of the first propulsor rotor using the electric machine while the second propulsor rotor continues to rotate; or stop rotation of the second propulsor rotor using the electric machine while the first propulsor rotor continues to rotate.

17. The assembly of claim 16, further comprising at least one of a first lock device configured to lock rotation of the ring gear about a centerline axis when rotation of the first propulsor rotor is stopped; or a second lock device configured to lock rotation of the carrier about the centerline axis when rotation of the second propulsor rotor is stopped.

18. The assembly of claim 16, further comprising:

a second epicyclic gear system including a second sun gear, a second ring gear and a plurality of second intermediate gears, the second sun gear rotatably driven by the electric machine, each of the plurality of second intermediate gears between and meshed with the second sun gear and the second ring gear, and each of the plurality of second intermediate gears rotatably mounted to the carrier; and an idler gear between and meshed with the ring gear and the second ring gear.

19. An assembly for an aircraft, comprising:

a rotating structure comprising a turbine rotor;

an epicyclic gear system including a sun gear, a ring gear and a plurality of intermediate gears, the sun gear rotatably driven by the rotating structure, and each of the plurality of intermediate gears between and meshed with the sun gear and the ring gear;

a carrier rotatably supporting each of the plurality of intermediate gears;

a first propulsor rotor coupled to the ring gear;

a second propulsor rotor coupled to the carrier; and a lock system configured to at least one of lock rotation of the ring gear about a centerline axis during a second propulsor mode of operation; or lock rotation of the carrier about the centerline axis during a first propulsor mode of operation.

20. The assembly of claim 19, further comprising an electric machine coupled to the first propulsor rotor and the second propulsor rotor through the epicyclic gear system, wherein the assembly is configured to at least one of stop rotation of the ring gear using the electric machine to facilitate locking rotation of the ring gear about the centerline axis; or stop rotation of the carrier using the electric machine to facilitate locking rotation of the carrier about the centerline axis.

* * * * *